(12) United States Patent
Brown et al.

(10) Patent No.: US 9,342,594 B2
(45) Date of Patent: May 17, 2016

(54) INDEXING AND SEARCHING ACCORDING TO ATTRIBUTES OF A PERSON

(75) Inventors: Lisa M. Brown, Pleasantville, NY (US); Raymond A. Cooke, Bloomington, MN (US); Rogerio S. Feris, Elmsford, NY (US); Arun Hampapur, Norwalk, CT (US); Frederik C. M. Kjeldsen, Poughkeepsie, NY (US); Christopher S. Milite, Oxford, CT (US); Stephen R. Russo, Southbury, CT (US); Chiao-Fe Shu, Scarsdale, NY (US); Ying-li Tian, Yorktown Heights, NY (US); Yun Zhai, White Plains, NY (US); Zuoxuan Lu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 530 days.

(21) Appl. No.: 12/260,418

(22) Filed: Oct. 29, 2008

(65) Prior Publication Data

US 2010/0106707 A1    Apr. 29, 2010

(51) Int. Cl.
*G06F 17/00* (2006.01)
*G06F 17/30* (2006.01)
*G06K 9/62* (2006.01)

(52) U.S. Cl.
CPC ........ *G06F 17/30793* (2013.01); *G06K 9/6254* (2013.01)

(58) Field of Classification Search
USPC .......................................... 707/711; 348/143
See application file for complete search history.

(56) References Cited

U.S. PATENT DOCUMENTS

| | | | |
|---|---|---|---|
| 6,549,913 B1 * | 4/2003 | Murakawa | |
| 7,203,693 B2 * | 4/2007 | Carlbom et al. | |
| 7,372,976 B2 | 5/2008 | Rhoads et al. | |
| 7,602,301 B1 * | 10/2009 | Stirling et al. | 340/573.1 |
| 8,151,077 B1 * | 4/2012 | Bauer et al. | 711/170 |
| 2002/0054174 A1 * | 5/2002 | Abbott et al. | 345/863 |
| 2002/0138374 A1 | 9/2002 | Jennings et al. | |
| 2004/0194129 A1 * | 9/2004 | Carlbom et al. | 725/32 |
| 2005/0054935 A1 * | 3/2005 | Rice et al. | 600/473 |
| 2005/0131894 A1 * | 6/2005 | Vuong | 707/5 |
| 2005/0146605 A1 * | 7/2005 | Lipton et al. | 348/143 |
| 2005/0149538 A1 * | 7/2005 | Singh et al. | 707/100 |
| 2006/0182310 A1 * | 8/2006 | Neuhaus | 382/103 |

(Continued)

OTHER PUBLICATIONS

Tian, Y-L., "Evaluation of Face Resolution for Expression Analysis," IEEE Workshop on Face Processing in Videos (FPIV'04), Washington, D.C., Jun. 2004, pp. 1-7.

(Continued)

*Primary Examiner* — Sherief Badawi
*Assistant Examiner* — Christopher J Raab
(74) *Attorney, Agent, or Firm* — Maeve L. McCarthy; Hunter E. Webb; Keohane & D'Alessandro PLLC

(57) ABSTRACT

An approach that indexes and searches according to a set of attributes of a person is provided. In one embodiment, there is an extensible indexing and search tool, including an extraction component configured to extract a set of attributes of a person monitored by a set of sensors in a zone of interest. An index component is configured to index each of the set of attributes of the person within an index of an extensible indexing and search tool. A search component is configured to enable a search of the index of the extensible indexing and search tool according to at least one of the set of attributes of the person.

20 Claims, 6 Drawing Sheets

(56) References Cited

U.S. PATENT DOCUMENTS

| | | |
|---|---|---|
| 2006/0227367 A1 | 10/2006 | Kitada |
| 2006/0230286 A1 | 10/2006 | Kitada |
| 2006/0256382 A1* | 11/2006 | Matraszek et al. ............ 358/1.18 |
| 2006/0271525 A1* | 11/2006 | Sukegawa ........................ 707/3 |
| 2007/0043608 A1* | 2/2007 | May et al. ........................ 705/10 |
| 2007/0061696 A1* | 3/2007 | Vallone et al. ............. 715/501.1 |
| 2007/0255735 A1* | 11/2007 | Taylor et al. .................. 707/100 |
| 2007/0294207 A1 | 12/2007 | Brown et al. |
| 2008/0069480 A1* | 3/2008 | Aarabi et al. .................. 382/305 |
| 2008/0204569 A1* | 8/2008 | Miller et al. ............... 348/222.1 |
| 2008/0205773 A1* | 8/2008 | Ma et al. ........................ 382/225 |
| 2008/0232681 A1 | 9/2008 | Feris et al. |
| 2008/0252723 A1* | 10/2008 | Park ............................... 348/143 |
| 2008/0294012 A1* | 11/2008 | Kurtz et al. ................... 600/300 |
| 2008/0297599 A1* | 12/2008 | Donovan et al. .............. 348/143 |
| 2009/0012760 A1* | 1/2009 | Schunemann .................... 703/6 |
| 2009/0059019 A1* | 3/2009 | Yang ........................... 348/220.1 |
| 2009/0093688 A1* | 4/2009 | Mathur ......................... 600/300 |
| 2009/0112810 A1* | 4/2009 | Jung et al. ......................... 707/3 |
| 2009/0185723 A1* | 7/2009 | Kurtz et al. ................... 382/118 |
| 2009/0271251 A1* | 10/2009 | Sorensen et al. ................ 705/10 |
| 2010/0030734 A1* | 2/2010 | Chunilal ........................... 707/3 |
| 2010/0111370 A1* | 5/2010 | Black ................ G06K 9/00369 382/111 |

OTHER PUBLICATIONS

Hampapur, A. et al., "Smart Surveillance: Applications, Technologies and Implications," IEEE Pacific-Rim Conference on Multimedia, Singapore, Dec. 2003, pp. 1-6.

Hampapur, A. et al., "The IBM Smart Surveillance System," IEEE CVPR, Washington, D.C., Jun. 2004, 2 pages.

Senior, A.W., "Real-time articulated human body tracking using silhouette information," IEEE workshop on performance evaluation of tracking and surveillance, Nice, France, Oct. 2003, pp. 1-8.

Tian, Y-L. et al., "Absolute Head Pose Estimation From Overhead Wide-Angle Cameras," IEEE International Workshop on Analysis and Modeling for Face and Gestures, Nice, France, Oct. 2003, 8 pages.

Senior, A.W. et al., "Blinkering Surveillance: Enabling Video Privacy through Computer Vision," IBM Technical Report RC22886, 2003, pp. 1-14.

Hampapur, A. et al., "Face Cataloger: Multi-Scale Imaging for Relating Identity to Location," IEEE conference on Advanced Video and Signal Based Surveillance, Miami, FL, Jul. 21-22, 2003, 8 pages.

Tian, Y-L. et al., "Real World Real-time Automatic Recognition of Facial Expressions," IEEE workshop on performance evaluation of tracking and surveillance, Graz, Austria, Mar. 31, 2003, pp. 1-8.

Tian, Y-L. et al., "Automatic Detecting Neutral Face for Face Authentication," AAAI-03 Spring Symposium on Intelligent Multimedia Knowledge Management, California, Mar. 24-26, 2003, 7 pages.

* cited by examiner

FIG. 4

SUSPECT DESCRIPTION FORM

| SEX | RACE | AGE | HEIGHT | WEIGHT | WEAPON |
|---|---|---|---|---|---|

- HAIR/FACIAL HAIR
- GLASSES (TYPE)
- TATOOS
- COMPLEXION
- SCARS/MARKS

- HAT (COLOR, TYPE)
- TIE
- COAT
- SHIRT
- PANTS/SHOES

Callouts:
- Male
- Dark
- No
- Light
- 160 – 200
- None (weapon)
- None (hat)
- Red, Short-Sleeved
- Blue Jeans & Dark Shoes 168, 170, 175

INDEXING AND SEARCHING ACCORDING TO ATTRIBUTES OF A PERSON

FIELD OF THE INVENTION

This invention relates generally to sensor-based surveillance and more specifically to the analysis of attributes of people monitored by a sensor.

BACKGROUND OF THE INVENTION

In today's environment, virtually every municipality, agency, educational institution, mass transportation center, financial institution, utility plant and medical center must plan for threats to the security of its property, employees, customers, citizens and information technology (IT) infrastructure. Additionally, businesses in every sector face challenges in protecting their customers, employees, and assets while working to reduce operating costs, improve productivity, and increase profits and customer satisfaction.

Analog video surveillance has typically involved the placement of analog video cameras in sensitive or strategic areas of a particular business, coupled with closed-circuit television (CCTV) for live monitoring. This serves not only to deter crime, but also to record the movement of people and property. Mobile methods of video surveillance, such as mounting cameras in patrol cars, buses and trains are also often utilized to record events.

The use of analog video cameras results in the creation of hundreds of videotapes that then must be viewed by security personnel. The cost of employing security guards to monitor hundreds of cameras, in addition to storing a high volume of videotapes, can be prohibitive. Additionally, videotapes can have poor image quality and may deteriorate over time.

Also, analog video can often only be viewed from a single end point that is not shared. This limits the ability to distribute information across an enterprise, which could help minimize company-wide threats and alerts. Finally, analog video systems cannot extract business intelligence from security data.

Digital video surveillance (DVS) has been used to overcome some of the shortcomings of traditional analog video surveillance systems. The emergence of digital video, IP video cameras, networked video recorders, web video, consumer cameras and video-based intelligence is opening up a wide range of applications providing enhanced functionality and business value to organizations. DVS enables clients to establish effective risk management strategies that will help them manage and safeguard business information and technology assets, anticipate vulnerabilities and risk, and maintain timely access to information.

Migrating to a DVS solution may help address some of the limitations of a tape-based analog system. DVS can help organizations achieve better returns on their security investments by: enabling real-time detection and potential prevention of security incidents through enhanced intelligence gathering; using event-based viewing for investigative purposes, thereby eliminating the need to chronologically review videotapes; reducing the need to monitor video cameras and change tapes; increasing product security by deterring potential shoplifters and monitoring staff; providing evidence against fraudulent claims; and increasing indoor and outdoor security.

However, many organizations have piecemeal solutions and may be challenged by having multiple systems that do not communicate with each other. Often, the separation of IT and physical security does not allow organizations to take advantage of existing IT infrastructures and applications, such as identification (ID) management and transactional systems that may already be in place. Operating separate systems for IT and physical security is not only less effective, but also more labor intensive and costly.

More recently, so-called "smart surveillance systems" have emerged, which apply automated signal analysis and pattern recognition to video cameras and sensors with the goal of automatically extracting "usable information" from video and sensor streams. However, prior art smart surveillance systems have been limited in the types of information that may be identified and extracted from people.

SUMMARY OF THE INVENTION

In one embodiment, there is a method for indexing and searching according to a set of attributes of a person. In this embodiment, the method comprises: extracting a set of attributes of a person monitored by a set of sensors in a zone of interest; indexing each of the set of attributes of the person within an index of an extensible indexing and search tool; and enabling a search of the index of the extensible indexing and search tool according to at least one of the set of attributes of the person.

In a second embodiment, there is a system for indexing and searching according to a set of attributes of a person. In this embodiment, the system comprises a set of sensors for monitoring a person in a zone of interest, at least one processing unit, and memory operably associated with the at least one processing unit. An extensible indexing and search tool is storable in memory and executable by the at least one processing unit. The extensible indexing and search tool comprises: an extraction component configured to receive sensor data from at least one of the set of sensors and extract a set of attributes of a person in the zone of interest; an index component configured to index each of the set of attributes of the person within an index of an extensible indexing and search tool; and a search component configured to search the index of the extensible indexing and search tool according to at least one of the set of attributes of the person.

In a third embodiment, there is a computer-readable medium storing computer instructions, which when executed, enables a computer system to provide indexing and searching according to a set of attributes of a person. In this embodiment, the computer instructions comprise: extracting a set of attributes of a person monitored by a set of sensors in a zone of interest; indexing each of the set of attributes of the person within an index of an extensible indexing and search tool; and enabling a search of the index of the extensible indexing and search tool according to at least one of the set of attributes of the person.

In a fourth embodiment, there is a method for deploying an extensible indexing and search tool for use in a computer system that provides indexing and searching according to a set of attributes of a person. In this embodiment, a computer infrastructure is provided and is operable to: extract a set of attributes of a person monitored by a set of sensors in a zone of interest; index each of the set of attributes of the person within an index of an extensible indexing and search tool; and enable a search of the index of the extensible indexing and search tool according to at least one of the set of attributes of the person.

BRIEF DESCRIPTION OF THE DRAWINGS

FIG. 4 shows a detailed view of an exemplary graphical user interface that operates with the extensible indexing and search tool shown in FIGS. 1-2 according to embodiments of the invention;

Figure 1:
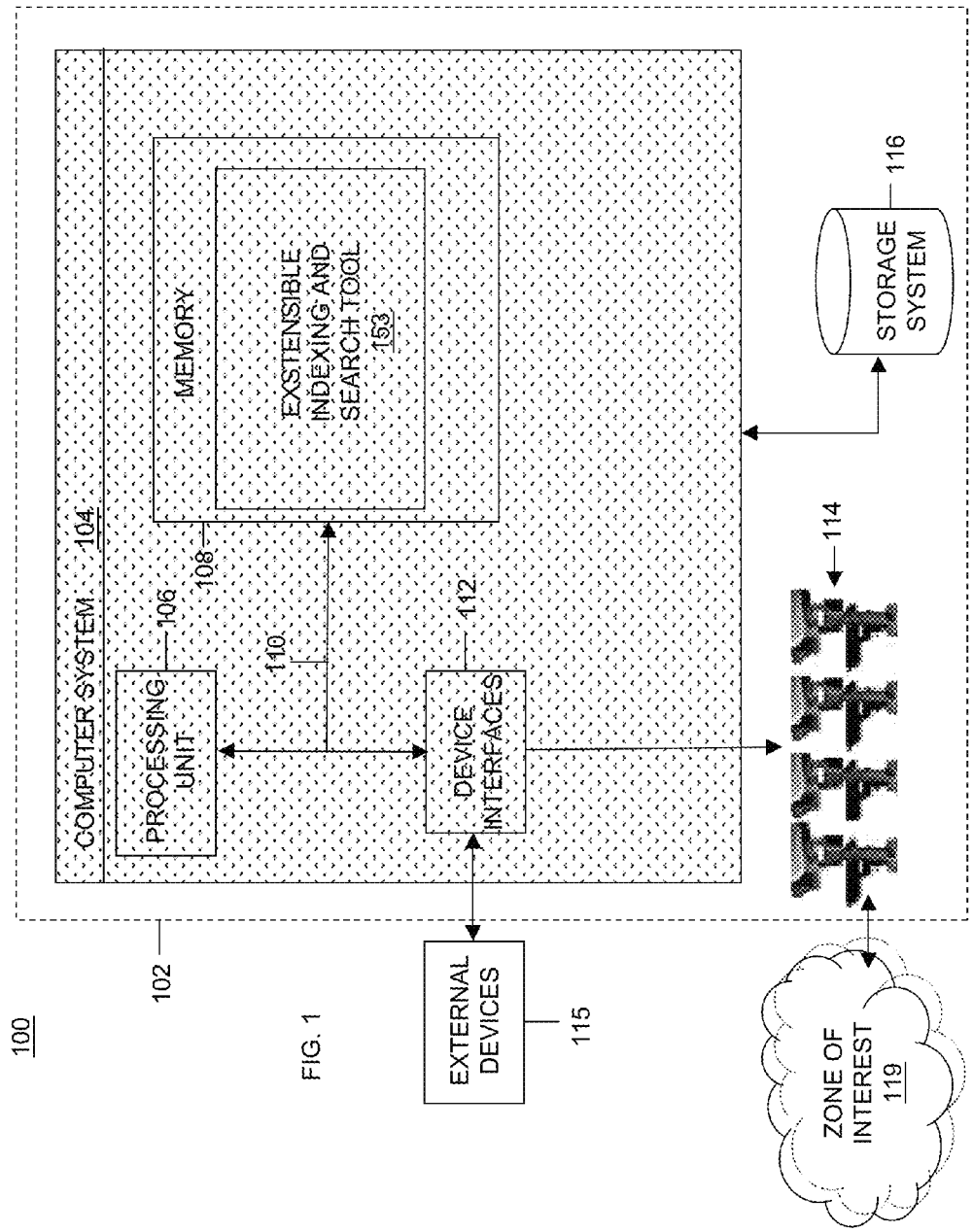
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to indexing and searching according to a set of attributes of a person, such that the person may be efficiently identified based on at least one of his/her attributes. In these embodiments, an extensible indexing and search tool provides this capability. Specifically, the extensible indexing and search tool comprises an extraction component configured to receive sensor data from at least one of a set (i.e., one or more) of sensors and extract a set of attributes of a person in the zone of interest. An index component is configured to index each of the set of attributes of the person within an index of an extensible indexing and search tool, and a search component is configured to search the index of the extensible indexing and search tool according to at least one of the set of attributes of the person to identify the person.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for indexing and searching according to a set of attributes of a person. It should be understood that any other computers implemented under the present invention may have different components/software, but will perform similar functions. As shown, computer system 104 includes a processing unit 106 capable of analyzing sensor data and producing a usable output, e.g., compressed video and video meta-data. Also shown is memory 108 for storing an extensible indexing and search tool 153, a bus 110, and device interfaces 112.

Computer system 104 is shown communicating with one or more external sensors 114 that communicate with bus 110 via device interfaces 112. Sensors 114 capture data representing attributes of objects (e.g., people) in a zone of interest 119. Sensors 114 can include any type of sensor capable of capturing attributes of people, such as, but not limited to: optical sensors, infrared detectors, thermal cameras, still cameras, analog video cameras, digital video cameras, or any other similar device that can generate sensor data of sufficient quality to support the methods of the invention as described herein.

Processing unit 106 collects and routes signals representing outputs from sensors 114 to extensible indexing and search tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the video signals may be encrypted using, for example, trusted key-pair encryption. Different sensor systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)). In some embodiments, sensors 114 are capable of two-way communication, and thus can receive signals (to power up, to sound an alert, etc.) from extensible indexing and search tool 153.

In general, processing unit 106 executes computer program code, such as program code for operating extensible indexing and search tool 153, which is stored in memory 108 and/or storage system 116. While executing computer program code, processing unit 106 can read and/or write data to/from memory 108 and storage system 116. Storage system 116 stores sensor data from sensors 114 and, optionally, video metadata generated by processing unit 106, including rules against which the metadata is compared to identify people and attributes of people. Storage system 116 can include VCRs, DVRs, RAID arrays, USB hard drives, optical disk recorders, flash storage devices, image analysis devices, general purpose computers, video enhancement devices, de-interlacers, scalers, and/or other video or data processing and storage elements for storing and/or processing video. The video signals can be captured and stored in various analog and/or digital formats, including, but not limited to, Nation Television System Committee (NTSC), Phase Alternating Line (PAL), and Sequential Color with Memory (SECAM), uncompressed digital signals using DVI or HDMI connections, and/or compressed digital signals based on a common codec format (e.g., MPEG, MPEG2, MPEG4, or H.264).

Although not shown, computer system 104 could also include I/O interfaces that communicate with one or more external devices 115 that enable a user to interact with computer system 104 (e.g., a keyboard, a pointing device, a display, etc.).

Figure 2:
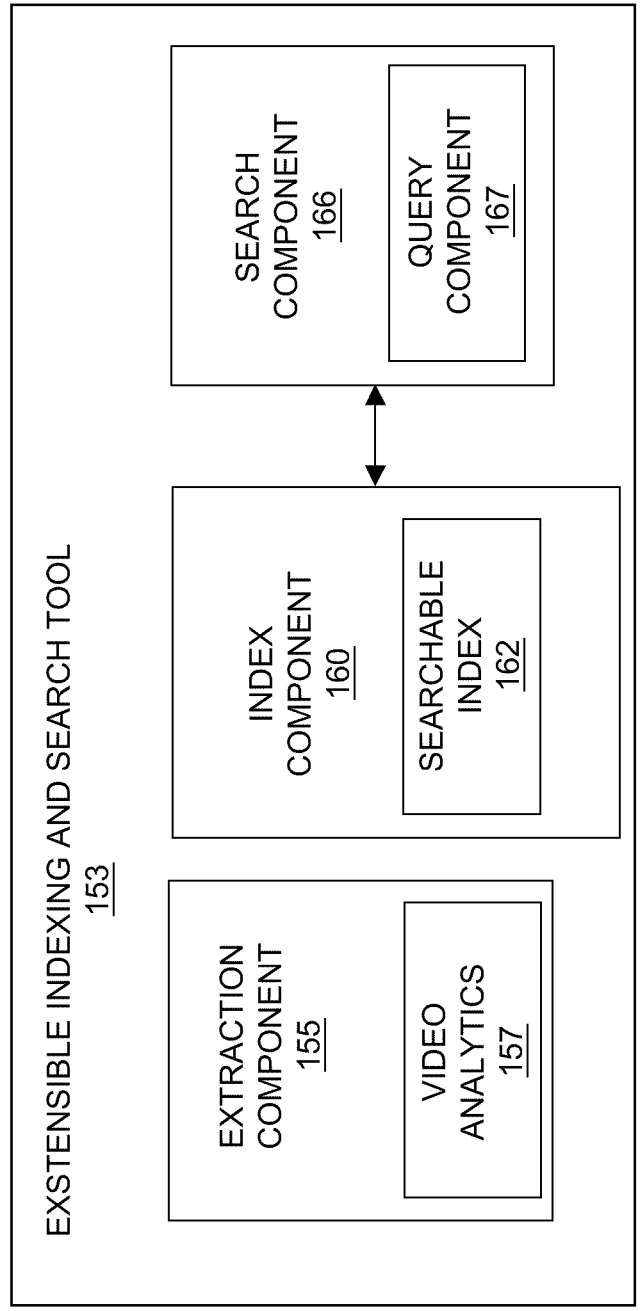
FIG. 2 shows a more detailed view of a extensible indexing and search tool that operates in the environment shown in FIG. 1.

FIG. 2 shows a more detailed view of extensible indexing and search tool 153 according to embodiments of the invention. As will be described in the exemplary embodiment herein, extensible indexing and search tool 153, in combination with implementation 100, is configured to parse sensor data, extract attributes of people and associated metadata from the sensor data, index the attributes, people, and metadata into an extensible index, and provide a query interface and result reporting mechanism for searching and locating people. Extensible indexing and search tool 153 is capable of accommodating a large and growing number of complex data types that require application specific indexing, searching and querying techniques, as will be further described below.

As shown in FIG. 2, extensible indexing and search tool 153 comprises an extraction component 155 configured to receive sensor data (e.g., video images) from at least one of sensors 114 and extract a set of attributes of a person from the sensor data. The set of attributes may comprise virtually any recognizable or measurable characteristic of a person, including, but not limited to: physical attributes, behavioral attributes, or physiological attributes. For example, a non-limiting list of physical attributes that may be extracted from the sensor data includes age, race, height, hair color, hair style, facial hair, height, weight, body size, body shape, skin appearance, skin abnormalities, facial expressions, facial abnormalities, the presence of items worn by a person (e.g., glasses, hats, hearing aids, watches, etc.), clothing color, clothing style, or any other visual physical attribute about a person or a group of people. A non-limiting list of behavioral attributes includes bodily actions such as walking, running, limping, riding a bicycle or a motorcycle, eating, sleeping, recreating, facial movements (e.g., facial expressions), etc. Depending on the type of sensor used (e.g., a high resolution thermal camera), physiological attributes of people may also be detected. A non-limiting list of physiological attributes includes body temperature, body odor, blood characteristics (e.g., blood pressure, heart rate, blood flow velocity through various locations, etc.), carbon dioxide levels, glucose levels and respiration rates. It can be appreciated that virtually any measurable attribute of a person can be received and extracted by extraction component 155. Extensible indexing and search component 153 is configured to accommodate for each attribute or attribute type by dynamically incorporating each new attribute or attribute type into the schema.

Extraction component 155 processes sensor data from sensors 114 (FIG. 1) in real-time, extracting attribute metadata from the attributes of people that are detected in zone of interest 119. In one embodiment, in which video sensor data is received from a video camera, extraction component 155 uploads messages in extensible mark-up language (XML) to a data repository, such as storage system 116 (FIG. 1). Extraction component 155 provides the software framework for hosting a wide range of video analytics 157 for processing the video signals. Video analytics 157 are intended to detect and track a person or a plurality of people moving across a video image, perform an analysis of all characteristics associated with each person, and extract a set of attributes from each person.

Extensible indexing and search tool 153 further comprises an index component 160 configured to index each of the set of attributes of the person within an index of extensible indexing and search tool 162. Index component 160 is configured to relate each of the set of attributes of the person to a canonical person model using a set of extensible indexing schemes. Specifically, index component 160 provides the algorithm(s) necessary to take the data associated with each of the extracted attributes and dynamically map it into tables or groups within searchable index 162. The attributes can be cross-referenced across multiple spatially distributed sensors to create a historical archive of people and events. Each person and his/her corresponding extracted attributes are organized within index of extensible indexing and search tool 162, along with additional metadata that captures a more detailed description of the extracted attribute and/or person. For example, each attribute may be annotated with information such as an identification (ID) of the sensor(s) used to capture the attribute, the location of the sensor(s) that captured the attribute, or a timestamp indicating the time and date that the attribute was captured. In this exemplary embodiment, index of extensible indexing and search tool 162 is located within extensible indexing and search tool 153. However, it can be appreciated that index of extensible indexing and search tool 162 could be a component or section of storage system 116, or clustered into a database system spanning multiple physical and logical devices.

As further shown in FIG. 2, extensible indexing and search tool 153 comprises a search component 166 for searching within index of extensible indexing and search tool 162 using a query component 167 that is configured to enable a query to index of extensible indexing and search tool 162 according to at least one of a set of attributes of a person. In one embodiment, search component 166 and query component 167 are extensible. For example, search component 166 is capable of adding new keywords, concepts and structures to the source language(s) that define the attributes within index of extensible indexing and search tool 162, while query component 167 provides flexible query facilities to extract data from real and virtual documents on the World Wide Web, therefore allowing the extensible indexing and search tool 153 to be used via the Internet. In an exemplary embodiment, search component 166 comprises a graphical user interface (GUI) and associated software algorithm(s) that enable a user to specify the query to the index of the extensible indexing and search tool, and view a result of the query. The GUI of search component 166 may be a web application (e.g., HTML, Java®, applets, Javascript®), which operates with index component 160 to provide the functionality needed by a user (e.g., security personnel, law enforcement, etc.) to query index of extensible indexing and search tool 162, and view the query result. (Java, and JavaScript are registered trademarks of Sun Microsystems, Inc.)

In one embodiment, the query result is returned to the user via the GUI of search component 166 and comprises at least one of the following: an ID of the sensor used to capture the person in the zone of interest, a timestamp representing a date and time that the person is captured in the zone of interest, an image capture of the person captured in the zone of interest, a link to the video image containing the person, or a representation of sensor data received from at least one of the set of sensors. It can be appreciated that this list is non-limiting, as the query result may return virtually any information useful for identifying and locating people captured within the sensor data. Also, it can be appreciated that a variety of GUI tools can be used to define complex search criteria to retrieve specific information from index of extensible indexing and search tool 62 within the scope of the present invention.

Figure 3:
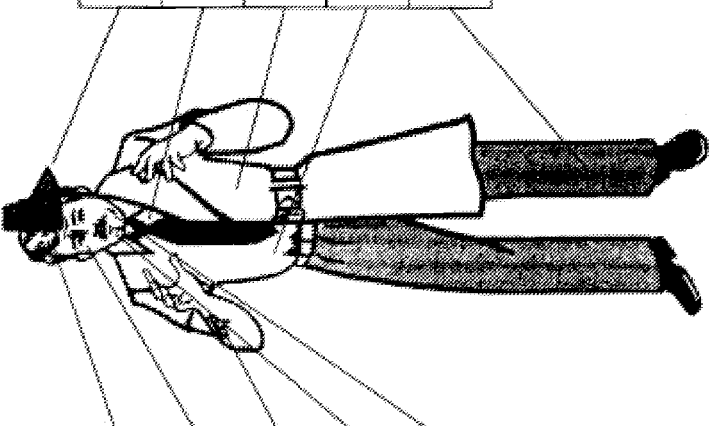
FIG. 3 shows an exemplary suspect description form used with the extensible indexing and search tool shown in FIGS. 1-2 according to embodiments of the invention.

Referring now to FIGS. 2-5, the present invention will be described in the context of the following example. In this example, a criminal assault occurs within an office building. In order to aid apprehension of the assault suspect, police officers may compile information into a suspect description form (SDF) 170, as shown in FIG. 3, which is a template that can be used to list attributes of the assault suspect(s) as identified by the assault victim and/or other witnesses. Police officers use the information gathered on SDF 170 to identify and locate the assault suspect, often times through the use of surveillance video data captured within the office building. A non-limiting listing of information that may be gathered using SDF 170 includes sex, race, age, height, weight, presence or type of weapon, hair/facial hair, glasses, tattoos, complexion, scars/marks, hat, tie, coat, shirt, pants, shoes, or facial features. Using extensible indexing and search tool 153 of the present invention, police officers may search large amounts of video data gathered from disparate sensors within the office building to identify the assault suspect based on attributes of the assault suspect.

As shown in FIG. 4, a police officer enters attribute information into a set of input boxes 175 of a GUI 168, which is a function of search component 166 (FIG. 2). Each of input boxes 175 corresponds to a separate physical attribute of the suspect. The police officer can work with the assault victim to fill in each of input boxes 175. Although in this example GUI 168 closely resembles SDF 170, it can be appreciated that a wide variety of GUI configurations are possible within the scope of the invention. Further, although this example focuses on indexing the physical attributes of the assault suspect, it will be appreciated that other attributes can be extracted and indexed as well.

Figure 5:
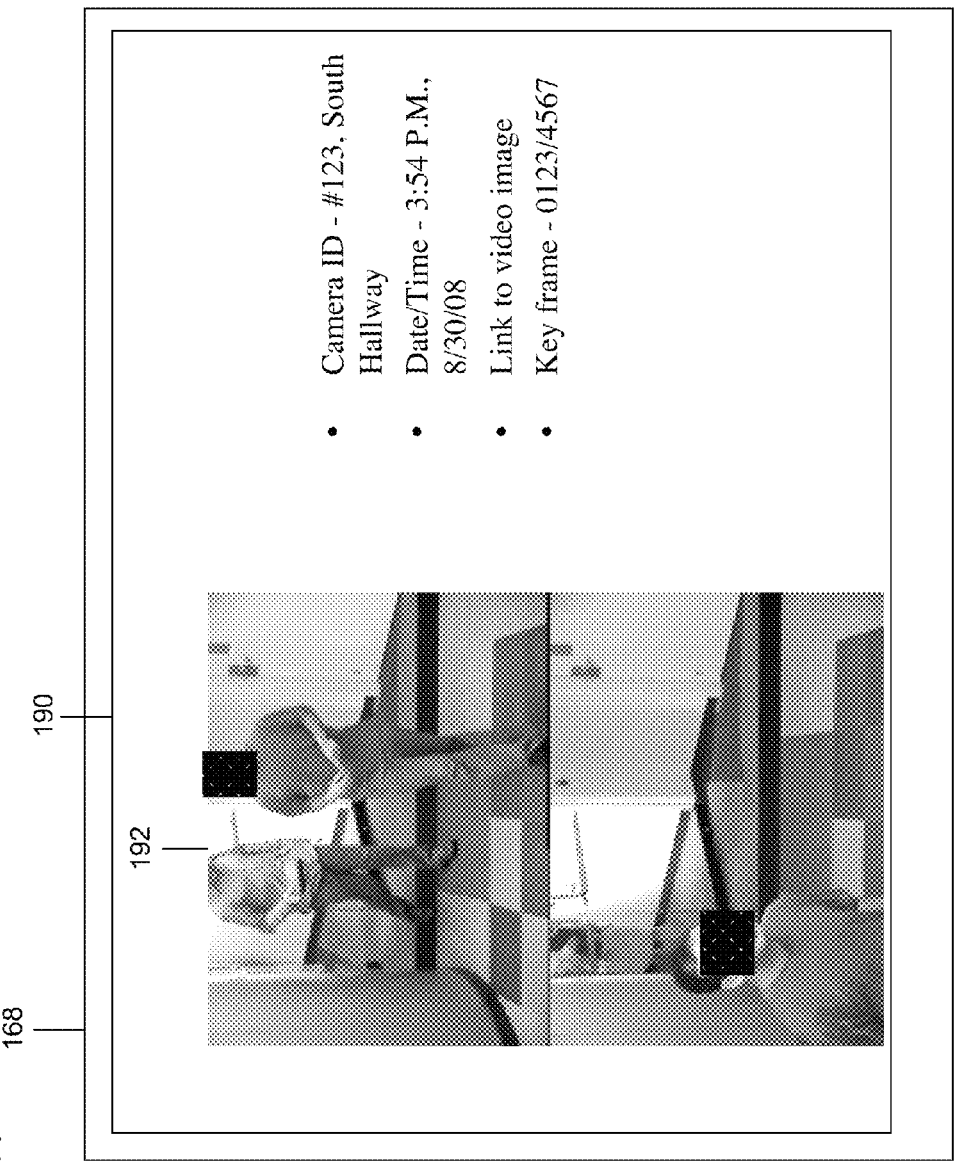
FIG. 5 shows another detailed view of an exemplary graphical user interface that operates with the extensible indexing and search tool shown in FIGS. 1-2 according to embodiments of the invention.

Search component 166 then takes the physical attribute information obtained from input boxes 175 within GUI 168 and compares it to the extracted physical attribute metadata stored in index of extensible indexing and search tool 162. As shown in FIG. 5, search component 166 generates a query result 190 that provides information regarding the identity and/or location of the assault suspect. In this example, query result 190 is displayed to the police officer via GUI 168. Query result 190 may contain textual information about the assault suspect(s), including a camera ID, a date/time that the assault suspect is captured in the video image, key frame identifying information, or a link to the video image containing the assault suspect. As shown, query result 190 may also return an image capture 192 of the assault suspect identified during the search. Image capture 192 contains the image of an individual who generally matches the attributes supplied to input boxes 175 of GUI 168 shown in FIG. 4. The police officer may use image capture 192 to verify the identity of the assault suspect with the victim and/or witnesses, or to generate a bulletin containing a picture of the assault suspect for distribution. Although only a single suspect is identified by the search in this example, it can be appreciated that the number of suspects identified may be greater depending on the level of specificity provided to input boxes 175. Generally, the greater the number of attributes supplied to GUI 168, the more specific and narrow query result 190 will be.

As described herein, the present invention allows for the identification of a person based on a set of attributes of the person. The present invention provides an extensible indexing and search tool in which a set of attributes of the person are extracted and indexed for a subsequent search that is based on at least one of the attributes of the person.

Further, it can be appreciated that the methodologies disclosed herein can be used within a computer system to provide indexing and searching according to a set of attributes of a person, as shown in FIG. 1. In this case, extensible indexing and search tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Figure 6:
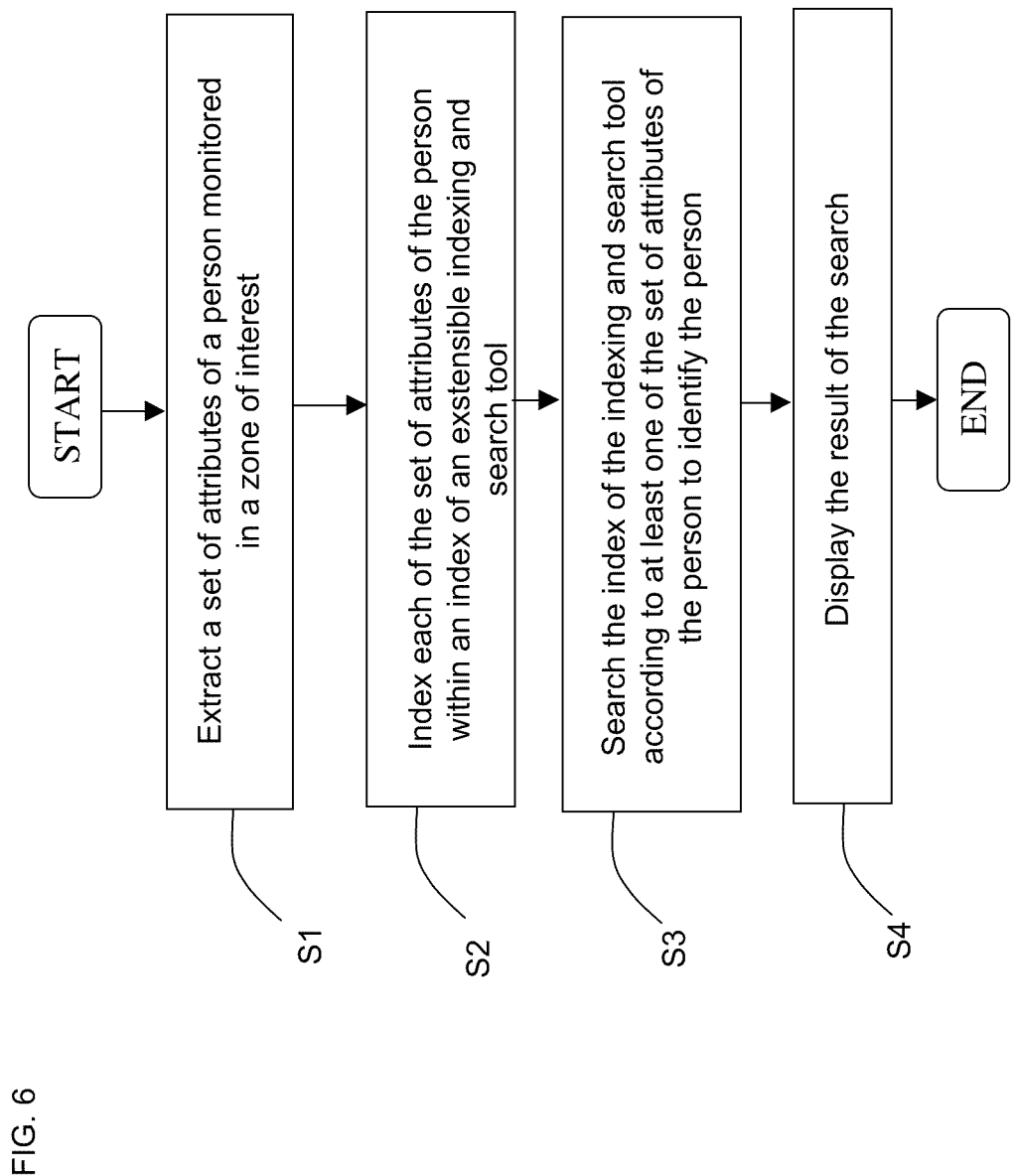
FIG. 6 shows a flow diagram of a method for indexing and searching according to a set of attributes of the person according to embodiments of the invention.

Computer system 104 carries out the methodologies disclosed herein, as shown in the flow diagram of FIG. 6. According to one embodiment, in step S1, a set of attributes of a person are extracted. In S2, each of the set of attributes of the person are indexed within an index of an extensible indexing and search tool. In S3, the index of the extensible indexing and search tool is searched according to at least one of the set of attributes of the person to identify the person. In S4, the result of the search is displayed. The flowchart of FIG. 6 illustrates the architecture, functionality, and operation of possible implementations of systems, methods and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

Furthermore, an implementation of exemplary computer system 104 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for indexing and searching according to a set of attributes of a person. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for indexing and searching according to a set of attributes of a person comprising:
   extracting a set of attributes of a person monitored by a set of sensors in a zone of interest, the set of attributes of the person comprising visual physical attributes, behavioral attributes, and physiological attributes;
   indexing each of the set of attributes of the person within an index of an extensible indexing and search tool, the indexing comprising relating each attribute of the set of attributes of the person to corresponding attribute in a canonical person model having a plurality of attribute types that distinguish one person from another, the plurality of attribute types including facial features, hair features, and clothing features, and dynamically incorporating, into a schema of the extensible indexing and search tool, a plurality of simultaneously received, different data types for each of the set of attributes, each of the plurality of simultaneously received, different data types having a unique set of application specific indexing requirements to incorporate new keywords, new concepts and new structures to an existing source language definition for each of the set of attributes;
   enabling a search of the index of the extensible indexing and search tool according to at least one of the set of attributes of the person to identify an instance of the person captured within received sensor data; and
   searching the index of the extensible indexing and search tool according to at least one of the set of attributes using the canonical person model to locate video data from the set of sensors containing an instance of a person having the at least one of the set of attributes.

2. The method according to claim 1, further comprising searching the index of the extensible indexing and search tool using a graphical user interface that allows a user to specify a query to the index of the extensible indexing and search tool, and view a result of the query.

3. The method according to claim 2, the result of the query comprising at least one of the following: an identification of a sensor used to capture the person in the zone of interest, a timestamp indicating a date and time that the person is captured in the zone of interest, an image capture of the person depicted in a video image, or a representation of sensor data received from at least one of the set of sensors.

4. The method according to claim 1, the indexing further comprising relating each of the set of attributes of the person to a canonical person model using a set of extensible indexing schemes.

5. The method according to claim 1, the indexing each of the set of attributes of the person further comprising indexing each of the set of attributes annotated with metadata information including identification of one or more of the set of sensors used to capture the attribute and a timestamp indicating the time and date that the attribute was captured.

6. A system for indexing and searching according to a set of attributes of a person comprising:
   a set of sensors for monitoring a zone of interest;
   at least one processing unit;
   memory operably associated with the at least one processing unit; and
   an extensible indexing and search tool storable in memory and executable by the at least one processing unit, the extensible indexing and search tool comprising:
   an extraction component configured to receive sensor data from at least one of the set of sensors and extract a set of attributes of a person monitored by a set of sensors in a zone of interest, the set of attributes of the person comprising visual physical attributes, behavioral attributes, and physiological attributes;
   an index component configured to index each of the set of attributes of the person within an index of an extensible indexing and search tool, the indexing comprising relating each attribute of the set of attributes of the person to corresponding attribute in a canonical person model having a plurality of attribute types that distinguish one person from another, the plurality of attribute types including facial features, hair features, and clothing features, and dynamically incorporating, into a schema of the extensible indexing and search tool, a plurality of simultaneously received, different data types for each of the set of attributes, each of the plurality of simultaneously received, different data types having a unique set of application specific indexing requirements to incorporate new keywords, new concepts and new structures to an existing source language definition for each of the set of attributes; and
   a search component configured to:
      enable a search of the index of the extensible indexing and search tool according to at least one of the set of attributes of the person to identify an instance of the person captured within received sensor data; and
      search the index of the extensible indexing and search tool using the canonical person model according to at least one of the set of attributes to locate video data from the set of sensors containing an instance of a person having the at least one of the set of attributes.

7. The system according to claim 6, the search component comprising a query component configured to enable a query to the index of the extensible indexing and search tool.

8. The system according to claim 7, the search component further configured to search the index of the extensible indexing and search tool using a graphical user interface that enables a user to specify the query to the index of the extensible indexing and search tool, and view a result of the query.

9. The system according to claim 8, wherein the search component is extensible.

10. The system according to claim 8, the result of the query comprising at least one of the following: an identification of a sensor used to capture the person in the zone of interest, a timestamp indicating the time and date that the person is captured in the zone of interest, an image capture of the person in a video image, or a representation of sensor data received from at least one of the set of sensors.

11. The system according to claim 7, wherein the query component is extensible.

12. The system according to claim 6, the index component further configured to relate each of the set of attributes of the person to a canonical person model using a set of extensible indexing schemes.

13. The system according to claim 6, the indexing component further configured to index each of the set of attributes of the person annotated with metadata information including identification of one or more of the set of sensors used to capture the attribute and a timestamp indicating the time and date that the attribute was captured.

14. A computer storage medium storing computer instructions, which when executed, enables a computer system to index and search according to a set of attributes of a person, the computer instructions comprising:

extracting a set of attributes of a person monitored by a set of sensors in a zone of interest, the set of attributes of the person comprising visual physical attributes, behavioral attributes, and physiological attributes;

indexing each of the set of attributes of the person within an index of an extensible indexing and search tool, the indexing comprising relating each attribute of the set of attributes of the person to corresponding attribute in a canonical person model having a plurality of attribute types that distinguish one person from another, the plurality of attribute types including facial features, hair features, and clothing features, and dynamically incorporating, into a schema of the extensible indexing and search tool, a plurality of simultaneously received, different data types for each of the set of attributes, each of the plurality of simultaneously received, different data types having a unique set of application specific indexing requirements to incorporate new keywords, new concepts and new structures to an existing source language definition for each of the set of attributes;

enabling a search of the index of the extensible indexing and search tool according to at least one of the set of attributes of the person to identify an instance of the person captured within received sensor data; and searching the index of the extensible indexing and search tool using the canonical person model according to at least one of the set of attributes to locate video data from the set of sensors containing an instance of a person having the at least one of the set of attributes.

15. The computer storage medium according to claim 14 further comprising computer instructions for searching the index of the extensible indexing and search tool using a graphical user interface that allows a user to specify a query to the index of the extensible indexing and search tool, and view a result of the query.

16. The computer storage medium according to claim 15, the result of the query comprising at least one of the following: an identification of a sensor used to capture the person in the zone of interest, a timestamp indicating a date and time that the person is captured in the zone of interest, an image capture of the person depicted in a video image, or a representation of sensor data received from at least one of the set of sensors.

17. The computer storage medium according to claim 14, the indexing further comprising computer instructions for relating each of the set of attributes of the person to a canonical person model using a set of extensible indexing schemes.

18. The computer storage medium of claim 14, the computer instructions for indexing each of the set of attributes of the person further comprising indexing each of the set of attributes annotated with metadata information including identification of one or more of the set of sensors used to capture the attribute and a timestamp indicating the time and date that the attribute was captured.

19. A method for deploying an extensible indexing and search tool for use in a computer system that provides for indexing and searching according to a set of attributes of a person, comprising:

providing a computer infrastructure operable to:

extract a set of attributes of a person monitored by a set of sensors in a zone of interest, the set of attributes of the person comprising visual physical attributes, behavioral attributes, and physiological attributes;

index each of the set of attributes of the person within an index of an extensible indexing and search tool, the indexing comprising relating each attribute of the set of attributes of the person to corresponding attribute in a canonical person model having a plurality of attribute types that distinguish one person from another, the plurality of attribute types including facial features, hair features, and clothing features, and dynamically incorporating, into a schema of the extensible indexing and search tool, a plurality of simultaneously received, different data types for each of the set of attributes, each of the plurality of simultaneously received, different data types having a unique set of application specific indexing requirements to incorporate new keywords, new concepts and new structures to an existing source language definition for each of the set of attributes;

enable a search of the index of the extensible indexing and search tool based on at least one of the set of attributes of the person to identify an instance of the person captured within received sensor data;

search the index of the extensible indexing and search tool using the canonical person model according to at least one of the set of attributes to locate video data from the set of sensors containing an instance of a person having the at least one of the set of attributes.

20. The method according to claim 19, the computer infrastructure further operable to relate each of the set of attributes of the person to a canonical person model using a set of extensible indexing schemes.

* * * * *